US011923608B2

(12) United States Patent
Greenidge et al.

(10) Patent No.: US 11,923,608 B2
(45) Date of Patent: Mar. 5, 2024

(54) ANTENNA APPARATUS AND DEPLOYMENT METHOD EMPLOYING COLLAPSIBLE MEMORY METAL

(71) Applicant: VIASAT, INC., Carlsbad, CA (US)

(72) Inventors: David D. Greenidge, Longmont, CO (US); David C. Wittwer, Chandler, AZ (US); Michael T. Kretsch, San Diego, CA (US); Kevin D. House, Gilbert, AZ (US); Mark D. Vossler, Tempe, AZ (US)

(73) Assignee: VIASAT, INC., Carlsbad, CA (US)

( * ) Notice: Subject to any disclaimer, the term of this patent is extended or adjusted under 35 U.S.C. 154(b) by 0 days.

(21) Appl. No.: 18/250,684

(22) PCT Filed: Oct. 14, 2021

(86) PCT No.: PCT/US2021/054938
§ 371 (c)(1),
(2) Date: Apr. 26, 2023

(87) PCT Pub. No.: WO2022/081817
PCT Pub. Date: Apr. 21, 2022

(65) Prior Publication Data
US 2023/0307843 A1 Sep. 28, 2023

Related U.S. Application Data

(60) Provisional application No. 63/091,922, filed on Oct. 14, 2020.

(51) Int. Cl.
*H01Q 15/00* (2006.01)
*H01Q 1/28* (2006.01)
*H01Q 21/26* (2006.01)

(52) U.S. Cl.
CPC ........... *H01Q 15/006* (2013.01); *H01Q 1/288* (2013.01); *H01Q 21/26* (2013.01)

(58) Field of Classification Search
CPC ....... H01Q 1/288; H01Q 15/006; H01Q 21/26
See application file for complete search history.

(56) References Cited

U.S. PATENT DOCUMENTS

2003/0052757 A1* 3/2003 McKinzie, III ...... H01Q 15/008 335/6
2007/0200763 A1* 8/2007 Allen ..................... H01Q 21/24 343/879
2010/0231479 A1* 9/2010 Hauhe ...................... H01Q 3/46 343/810

OTHER PUBLICATIONS

International Search Report dated Jan. 25, 2022 in corresponding PCT Patent Application No. PCT/US2021/054938 (13 pages).

(Continued)

*Primary Examiner* — Graham P Smith
*Assistant Examiner* — Amal Patel
(74) *Attorney, Agent, or Firm* — F. CHAU & ASSOCIATES, LLC

(57) ABSTRACT

An artificial magnetic conductor (AMC) antenna apparatus includes a ground plane and a flexible antenna element layer above the ground plane. The ground plane includes a conductive base surface, a plurality of memory metal wires, and a frequency selective surface (FSS) layer above the base surface, where the FSS layer includes a plurality of conductive patches separated from one another. Each of the memory metal wires electrically connects one of the conductive patches to the base surface. Each of the memory metal wires is rigid in a memory-shaped state, causing the FSS layer to be fixedly spaced from the base surface during operation of the AMC antenna apparatus. The memory metal wires are each flexible in a non-memory-shaped state, (Continued)

enabling the FSS layer to be collapsed towards the base surface when the antenna apparatus is stowed.

20 Claims, 12 Drawing Sheets

(56) References Cited

OTHER PUBLICATIONS

Lokman Abdul Halim et al: "Gain enhanced circularly polarized antenna integrated with artificial magnetic conductor for S-band pico-satellites", International Journal of RF and Microwave Computer-Aided Engineering, vol. 28, No. 7, Sep. 1, 2018 (Sep. 1, 2018), pp. 1-8, XP055878122, ISSN: 1096-4290, DOI: 10.1002/mmce.21462 abstract; figures 3,4,5,6,12,13, p. 1-p. 8.
O'neill Greg: "Quadrifilar Helical Antenna", 2016 International Workshop on Antenna Technology (IWAT), IEEE, Feb. 29, 2016 (Feb. 29, 2016), pp. 116-118, XP032881881, DOI: 10.1109/IWAT.2016.7434818 [retrieved on Mar. 16, 2016] abstract.

* cited by examiner

ANTENNA APPARATUS AND DEPLOYMENT METHOD EMPLOYING COLLAPSIBLE MEMORY METAL

CROSS REFERENCE TO RELATED APPLICATIONS

This application is a 371 National Stage entry of PCT application no. PCT/US2021/054938, filed on Oct. 14, 2021, which claims priority to U.S. Provisional Application No. 63/091,922, filed in the U.S. Patent and Trademark Office on Oct. 14, 2020, of which the entire contents of both are incorporated herein by reference.

TECHNICAL FIELD

This disclosure relates generally to storage and deployment techniques for antennas with ground planes; and to artificial magnetic conductor (AMC) antennas.

DISCUSSION OF RELATED ART

In a traditional antenna over a ground plane, the radiating element is spaced one quarter wavelength (λ/4) from the ground plane to achieve constructive interference with the reflected signal and thereby increase directivity. At relatively low frequencies, however, the λ/4 distance may be longer than desired, resulting in a thick antenna profile (e.g., 25 cm at 300 MHz).

With an artificial magnetic conductor (AMC) ground plane, the spacing between the ground plane and the radiating element is significantly smaller, and comparable directivity performance may be realized for the antenna. An AMC ground plane may include a conductive base surface and a "frequency selective surface" (FSS) composed of a plurality of conductive patches separated from one another. The conductive patches may be electrically connected to the base surface through respective wires which are typically embedded within a low loss dielectric. The resulting structure, although thinner than traditional ground plane based antennas, is stiff and burdensome to transport, particularly for large aperture antennas configured for frequencies below 1 GHz.

SUMMARY

In an aspect of the present disclosure, an artificial magnetic conductor (AMC) antenna apparatus includes a ground plane and a flexible antenna element layer including at least one antenna element above the ground plane. The ground plane includes a conductive base surface, a plurality of memory metal wires, and a frequency selective surface (FSS) layer above the base surface, where the FSS layer includes a plurality of conductive patches separated from one another. Each of the memory metal wires electrically connects one of the conductive patches to the base surface. Each of the memory metal wires is rigid in a memory-shaped state, causing the FSS layer to be fixedly spaced from the base surface during operation of the AMC antenna apparatus. The memory metal wires are each flexible in a non-memory-shaped state, enabling the FSS layer to be collapsed towards the base surface when the antenna apparatus is stowed.

The AMC antenna apparatus may further include a retaining structure configured to retain, when the antenna apparatus is stowed, the antenna element layer and the ground plane with the FSS layer collapsed towards the base surface.

The retaining structure may retain the antenna element layer and the ground plane in a coiled state.

The AMC antenna apparatus may further include at least one actuator configured to remove the antenna element layer and the ground plane from the retaining structure.

In another aspect, a method of deploying an AMC antenna on an unmanned carrier is provided. The AMC antenna includes: (i) an antenna element layer; and (ii) a ground plane with a conductive base surface, an FSS layer, and a plurality of memory metal wires electrically and mechanically coupling the conductive base surface to the FSS layer. The memory metal wires are in a collapsed, non-memory-shaped state when the AMC antenna apparatus is stored. The method involves storing the AMC antenna in a retaining structure; and removing, using an actuator, the AMC antenna from the retaining structure to deploy the AMC antenna. The memory metal wires automatically transform from flexible to rigid states when ambient temperature exceeds a threshold, causing the FSS to be fixedly spaced from the base surface following the removal of the AMC antenna from the retaining structure.

BRIEF DESCRIPTION OF THE DRAWINGS

The above and other aspects and features of the disclosed technology will become more apparent from the following detailed description, taken in conjunction with the accompanying drawings in which like reference characters indicate like elements or features. Various elements of the same or similar type may be distinguished by annexing the reference label with an underscore/dash and second label that distinguishes among the same/similar elements (e.g., _1, _2), or directly annexing the reference label with a second label. However, if a given description uses only the first reference label, it is applicable to any one of the same/similar elements having the same first reference label irrespective of the second label. Elements and features may not be drawn to scale in the drawings.

DETAILED DESCRIPTION OF EMBODIMENTS

The following description, with reference to the accompanying drawings, is provided to assist in a comprehensive understanding of certain exemplary embodiments of the technology disclosed herein for illustrative purposes. The description includes various specific details to assist a person of ordinary skill the art with understanding the technology, but these details are to be regarded as merely illustrative. For the purposes of simplicity and clarity, descriptions of well-known functions and constructions may be omitted when their inclusion may obscure appreciation of the technology by a person of ordinary skill in the art.

Figure 1:
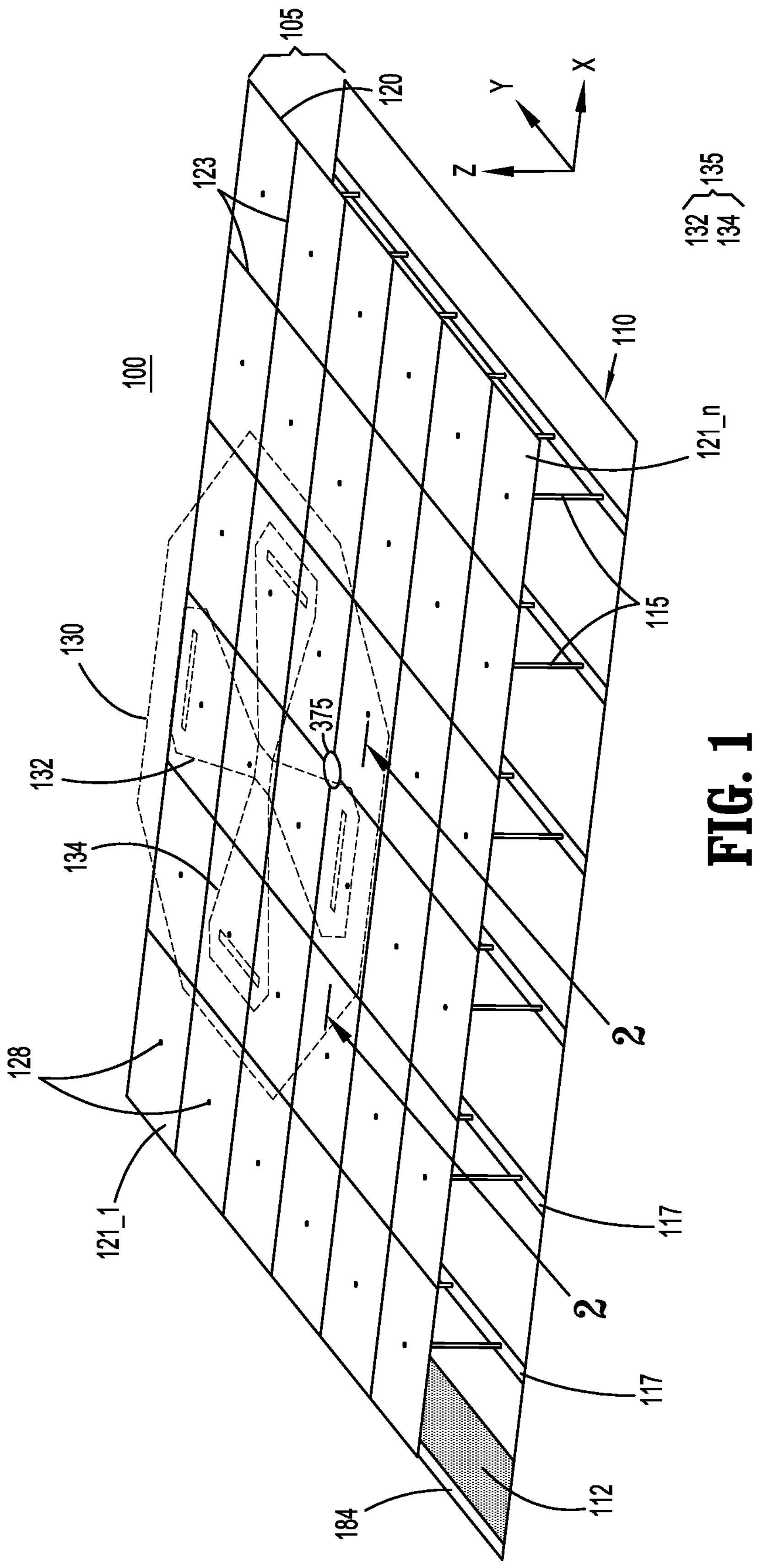
FIG. 1 is a perspective view of an example AMC antenna in an operational configuration, according to an embodiment.

FIG. 1 is a perspective view of an example artificial magnetic conductor (AMC) antenna in an operational configuration, according to an embodiment. AMC antenna 100 (interchangeably, "AMC antenna apparatus 100") may include a ground plane 105, an antenna element layer 130 with at least one antenna element, and an antenna feed (e.g., 300 of FIG. 3, omitted from FIG. 1 for clarity). Ground plane 105 may include: a base layer 110 having a conductive base surface; a frequency selective surface (FSS) layer 120; and a plurality of memory metal wires 115 electrically connecting FSS layer 120 to the conductive base surface. In some embodiments, elements 115 can be an elongated structure other than a wire such as a memory metal column. Ground plane 105 with such a textured surface configuration may be understood as a "high impedance surface" within a given frequency band, in which surface wave modes differ significantly from those on a smooth metallic surface. (Note that the term "frequency selective surface (FSS)" emphasizes the frequency sensitive nature of the high impedance surface.) Ground plane 105 may also be understood as an "in-phase reflector" with suppressed surface waves. The textured structure of ground plane 105 enables AMC antenna 100 to be made substantially thinner than traditional ground plane antennas, i.e., non-AMC antennas with a radiating element spaced λ/4 over a ground plane.

FSS layer 120 includes a plurality of conductive patches 121_1 to **121_*n* separated from one another by narrow isolation regions ("streets") 123. Note that each conductive patch 121 in FIG. 1 may include a conductive surface printed on a thin dielectric sheet such as a polyimide film (e.g., Kapton®), and the isolation regions 123 may be regions of the dielectric sheet without a printed conductor. Thus, conductive patches 121_1 to 121_*n* along with the dielectric sheet (and in some cases, an additional dielectric sheet on the opposite side of the printed conductor) may collectively form a continuous sheet-like or sandwich-type structure. The width of an isolation region 123 is small relative to the area of a conductive patch 121, generating a capacitance between adjacent conductive patches 121 that contributes to forming the high impedance surface. Each memory metal wire 115 may be oriented in the z (vertical) direction and electrically connect one of the conductive patches 121 to the conductive base surface of base layer 110, such that a "bed of nails" structure is provided between the base layer 110 and FSS layer 120. Each of base layer 110, FSS layer 120 and antenna element layer 130** may be flexible sheet-like structures having major surfaces oriented in the x-y plane.

Memory metal wires 115 are rigid, as depicted in FIG. 1, in a memory-shaped state that may occur when ambient temperature is above a threshold ("memory-shape threshold"). Memory metal wires 115 may be composed of nickel-titanium (NiTi), also known as nitinol, or another suitable shape-memory alloy such as copper-aluminum-nickel or an alloy including copper, iron, zinc and gold. By virtue of their rigidity in the memory-shaped state, memory metal wires 115 may mechanically support FSS 120 with respect to base layer 110 in the operational configuration to achieve a fixed spacing therebetween (e.g., a uniform spacing between all regions of FSS 120 and base layer 110). Memory metal wires 115 are flexible in a non-memory-shaped state during a non-operational stowage state, discussed and illustrated later, which may be initiated when ambient temperature is below the memory-shape threshold. For example, a memory metal wire 115 composed of nitinol changes its state from austenite to martensite when cooled below the memory-shape threshold, enabling the memory metal wire 115 to enter a flexible state. When the memory metal wires 115 are flexible, FSS layer 120 and antenna element layer 130 may be caused to collapse towards base layer 110, enabling AMC antenna 100 to be stowed in a smaller volume than that occupied in the operational state. This facilitates stowage and transportation of AMC antenna 100, and, in some cases, unmanned deployment on a carrier such as an orbital satellite. In some examples, AMC antenna 100 is stowed in a retaining structure rolled up or folded, as described and illustrated below. When AMC antenna 100 is removed from the retaining structure and ambient temperature exceeds the memory-shape threshold, memory metal wires 115 may automatically transform back to austenite, the memory-shaped state. With AMC antenna 100, the memory-shaped state may be a linear configuration.

Through suitable design of the number, geometry and layout of conductive patches 121; the at least one antenna element of antenna layer 120; the lengths of memory metal wires 115; and the spacing between antenna element layer 130 and FSS 120, an AMC phenomenon is realizable. As noted, the AMC phenomenon enables AMC antenna 100 to be significantly thinner than the traditional antenna having a radiating element spaced λ/4 over a ground plane. For instance, the AMC phenomenon allows for efficient antenna performance with spacing between the antenna element layer 130 and base surface 119<<λ/4, e.g., in the λ/40 to λ/10 range. Such efficiency may be realized due to in-phase reflection and suppression of surface waves. Thus, despite the close spacing between the layers, constructive interference occurs between a signal radiated directly into free space by antenna element layer 130 and the same signal initially propagated towards, and then reflected from, ground plane 105.

In the embodiment of FIG. 1, an example antenna element is illustrated as a crossed-dipole 135 including a first dipole element 132 and a second dipole element 134 orthogonal to first dipole element 132. Other types of antenna elements may be substituted, such as a single dipole, a loop antenna, an array of microstrip patch elements, and so forth. The crossed-dipole 135 may be printed on a dielectric sheet, illustrated with a hexagonal shape occupying a smaller surface area than each of FSS layer 120 and base layer 110 in FIG. 1. In other examples, antenna element layer 130 is coextensive in the x-y plane with each of FSS layer 120 and base layer 110. An example construction of ground plane 105 includes a plurality of dielectric or metallic ribs 117, each oriented longitudinally in the y or x directions, for added structural support of bottom ends of memory metal wires 115. Conductive patches 121_1 to 121_n may each be arranged in a lattice and have identical geometries, e.g., all rectangular or all square as depicted, or alternatively all hexagonal, all circular or another suitable shape. Conductive patches 121_1 to 121_n may also be configured with identical or substantially identical dimensions (e.g., within manufacturing tolerances) in some embodiments. Each conductive patch 121 may electrically connect to a respective memory metal wire 115 through a connection 128 in a central location thereof. Note that an input section of base layer 110 may include an input flap 112 and an edge rib 184 for mechanical connection to a retaining structure in some applications.

Figure 2:
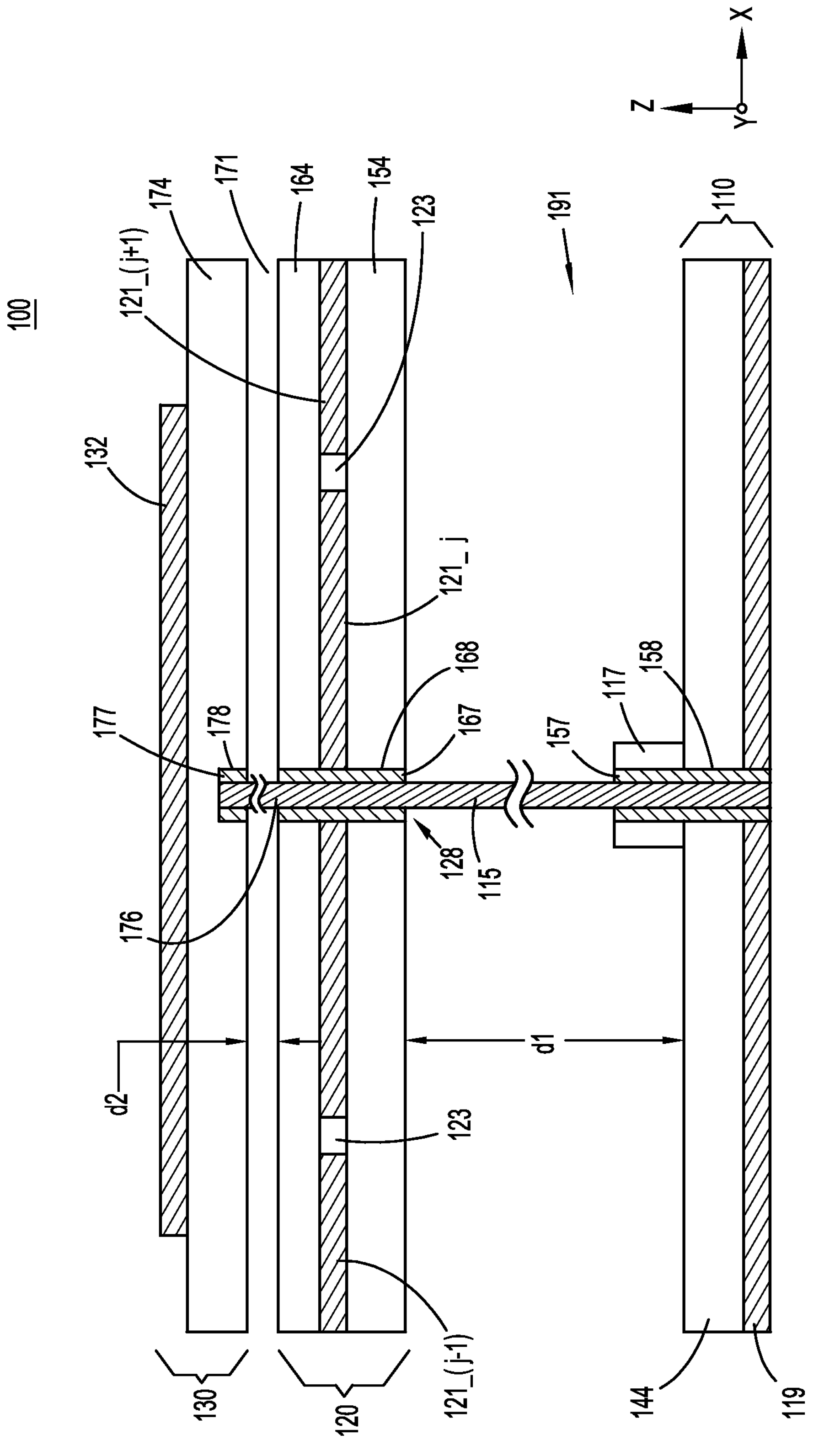
FIG. 2 is a cross-sectional view taken along the lines 2-2 of FIG. 1, depicting an example inter-layer structure of the AMC antenna.

FIG. 2 is a cross-sectional view taken along the lines 2-2 of FIG. 1, and depicts an example inter-layer structure of AMC antenna 100 during an operational (deployed) state. (In FIG. 2 and other cross-sectional views herein, features located behind those illustrated may be omitted for clarity.) Base layer 110 may include a conductive base surface 119 adhered to or printed at a bottom surface of a flexible dielectric sheet 144 for structural integrity and to facilitate electrical and mechanical connections to memory metal wires 115 (interchangeably, "memory wires" 115). A dielectric rib 117 may be adhered to a top surface of dielectric sheet 144 and support a connection of a memory wire 115 to base surface 119. A plated through hole 158 may have been formed through rib 117 and base layer 110. A bottom end of memory wire 115 may have been inserted within through hole 158 and electrically connected to conductive base surface 119 with a conductive adherent 157 surrounding memory wire 115 within through hole 158, e.g., solder that was melted and cooled.

FSS layer 120 may include conductive patches 121_1 to 121_n sandwiched between a lower dielectric sheet 154 and an upper dielectric sheet 164. Alternatively, FSS layer 120 is constructed with a single dielectric sheet 154 or 164 with conductive patches 121 printed thereon. A mechanical and electrical connection 128 between an upper portion of memory wire 115 and FSS layer 120 may comprise a plated through hole 168, an upper portion of memory wire 115, and a conductive adherent 167 within through hole 168. FIG. 2 depicts a single connection 128 between a memory wire 115 and a given conductive patch 121_j, which is separated by respective isolation regions 123 from adjacent conductive patches 121_(j−1) and 121_(j+1). Dielectric sheet 164 including isolation regions 123 may have been formed by layered deposition of dielectric material atop conductive patches 121, subsequent to deposition of conductive patches 121 on the upper surface of dielectric sheet 154. However, if dielectric sheet 164 is omitted, isolation regions 123 may be air gaps or a dielectric filler. Each of dielectric sheets 144, 154, 164 and 174 may be a polyimide film such as Kapton®.

Electrical connections 128 throughout AMC antenna 100 may each be formed at a distance d1 above dielectric sheet 144 (with memory wires in the rigid state). In this manner, FSS layer 120 may be supported by memory wires 115 with its lower surface uniformly spaced throughout by distance d1 from base layer 110. An air gap 191 may be present in the regions surrounding memory wires 115.

Antenna element layer 130 may include the at least one antenna element 132 printed atop dielectric layer 174. An example mechanical connection between antenna element layer 130 and FSS layer 120 may include an extension portion 176 of memory wire 115 extending above the upper surface of dielectric sheet 164, a plated blind via 178 in the lower surface of dielectric sheet 174, and an electrically conductive adherent 177 such as solder. The upper end of extension 176 may have been inserted within via 178 and adhered to dielectric sheet 174 by melting and cooling adherent 177. All or most of memory wires 115 underlaying antenna element layer 130 may likewise include an extension 176 adhered to dielectric sheet 174 in this manner. As a result, antenna element layer 130 may be entirely supported by memory wires 115 and uniformly spaced at a distance d2 (with memory wire 115 in the rigid state) from the upper surface of FSS layer 120. It is noted that if antenna layer 130 is only centrally located with respect to FSS layer 120, as in the example of FIG. 1, then the memory wires 115 located outside the region of antenna layer 130 may omit extensions 176. These peripheral memory wires 115 may all be designed with the same or substantially the same length (e.g., within manufacturing tolerances), and the top ends may be flush with the upper surface of dielectric sheet 164. In a similar vein, each of the memory wires 115 underlaying antenna layer 130 may be identically or substantially identically designed, with extensions 176 of the same or substantially the same length (e.g., within manufacturing tolerances).

With the above-described mechanical connection between FSS layer 120 and antenna element layer 130, an air gap 171 may exist between layers 120 and 130. When memory wires 115 are in the non-memory metal shaped state (flexible state), antenna element layer 130 may be caused to collapse relative to FSS layer 120, whereupon the distance d2 is reduced in the stowed state. In an alternative configuration, extensions 176 on memory wires 115 are omitted throughout AMC antenna 100; dielectric sheets 164 and 174 are fused or formed as a single dielectric sheet; and no air gap 171 exists between FSS layer 120 and antenna element layer 130.

Figure 3:
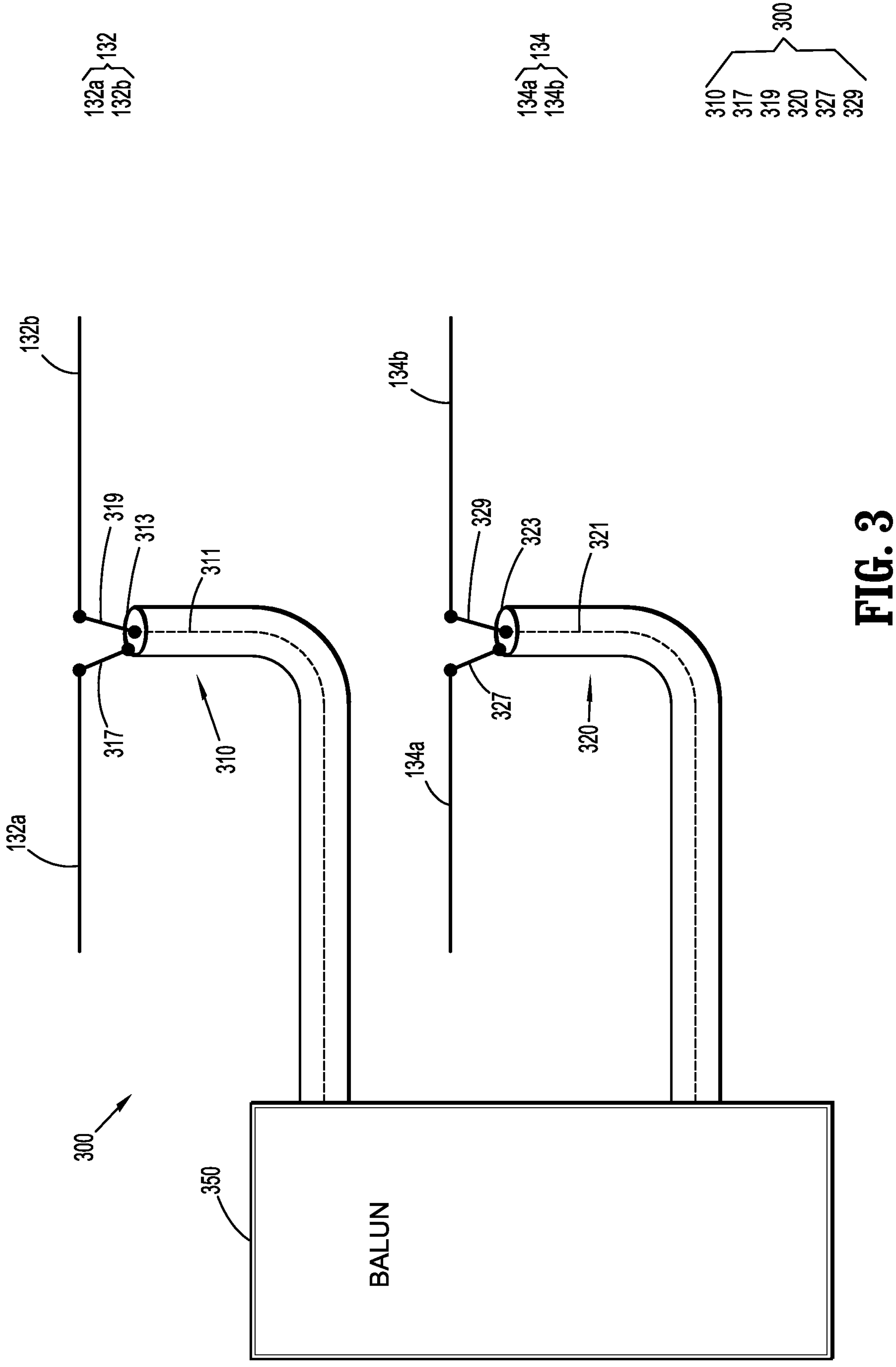
FIG. 3 is a schematic diagram illustrating an example antenna feed connected to antenna elements of the AMC antenna of FIG. 1.

FIG. 3 is a schematic diagram illustrating an example antenna feed, 300, that may connect to antenna element 135 of the AMC antenna 100. Antenna feed 300 may include a balun 350; a first flexible coaxial cable 310 having a first end connected to balun 350 and having an outer conductor 313 and an inner conductor 311; a second flexible coaxial cable 320 having a first end connected to balun 350 and having an outer conductor 323 and an inner conductor 321; and first, second, third and fourth interconnects 317, 319, 327 and 329, respectively. In some embodiments, there may be multiple connected baluns (e.g., a pair of connected baluns). First dipole element 132 includes dipoles arms 132a and 132b; second dipole element 134 includes dipole arms 134a and 134b. A second end of first coaxial cable 310 connects to first dipole element 132, with interconnect 317 connecting outer conductor 313 to dipole arm 132a and interconnect 319 connecting inner conductor 311 to dipole arm 132b. A second end of second coaxial cable 310 connects to second dipole element 134, with interconnect 327 connecting outer conductor 323 to dipole arm 134a and interconnect 329 connecting inner conductor 321 to dipole arm 134b.

Figure 4:
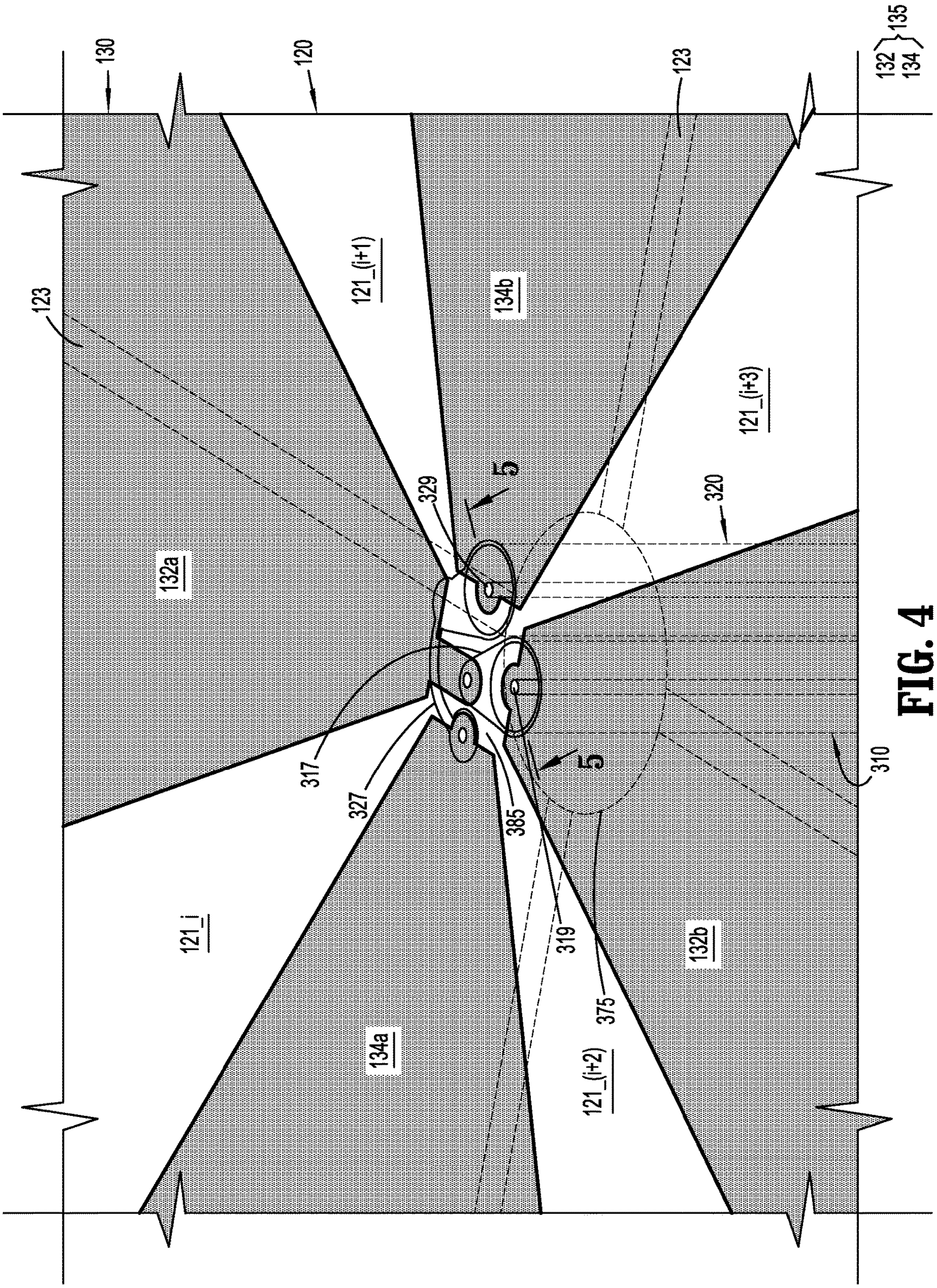
FIG. 4 is a perspective view of a central portion of an upper part of the AMC antenna of FIG. 1, illustrating a portion of the example antenna feed.

FIG. 4 is a perspective view depicting an example central portion of an upper part of the AMC antenna 100 of FIG. 1, illustrating a portion of the example antenna feed 300. A central portion of crossed-dipole antenna element 135 may overlay an intersection region of centralized, adjacent conductive patches 121_i, 121_(i+1), 121_(i+2) and 121_(i+3). An opening 375 in FSS layer 120 may be formed in the centralized region, by removing a corner piece of each of conductive patches 121_i to 121(i+3). Another opening 385 may have been formed in a centralized region of antenna element layer 130. Coaxial cables 310 and 320 may extend vertically (z direction) between antenna element layer 130 and base layer 110 during the deployed state of AMC antenna 100. During the stowage state, coaxial cables may be caused to collapse between antenna element layer 130 and base layer 110.

The second ends of coaxial cables 310 and 320 may penetrate opening 375 and at least partially penetrate opening 385. Interconnects 317 and 327 may each be embodied as wire bonds. Alternatively, interconnects 317 and 327 are in the form of a funnel shaped metal section integrated with a wire extension. The funnel shaped metal section is soldered or otherwise electrically connected to the respective outer conductors 313 or 323, and the wire extension is soldered or otherwise electrically connected to an input point of dipole arm 132*a* or 134*a*. Interconnects 319 and 329 may be direct solder connections to input points of dipole arms 132*b* and 134*b*, respectively.

Figure 5:
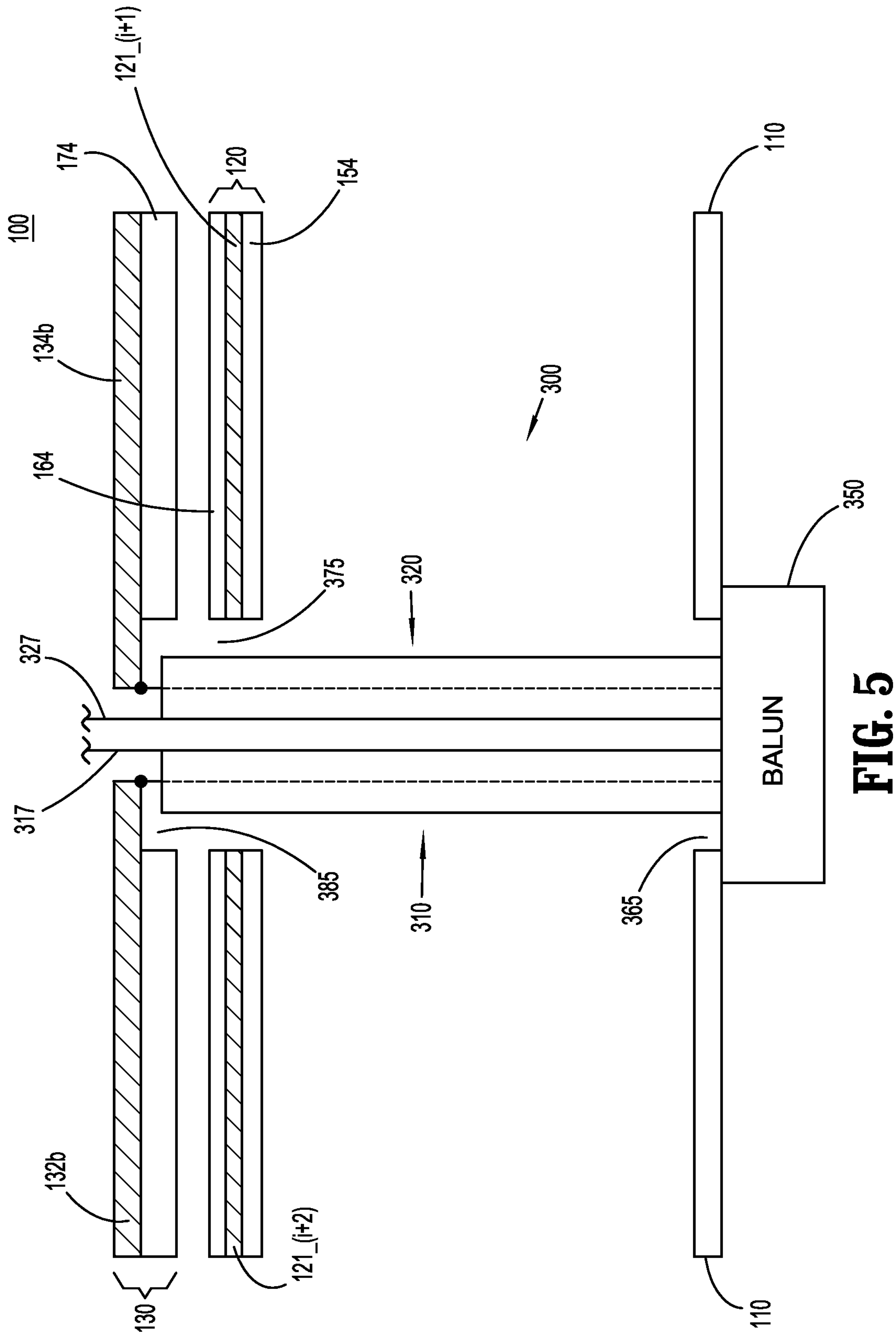
FIG. 5 is a cross-sectional view taken along the lines 5-5 of FIG. 4, depicting an example integration of the antenna feed within the AMC antenna.

FIG. 5 is a cross-sectional view taken along the lines 5-5 of FIG. 4, depicting an example integration of antenna feed 300 within AMC antenna 100. This view shows that balun 350 may be disposed adjacent to the lower surface of AMC antenna 100, and the lower ends of coaxial cables 310 and 320 may penetrate an opening 365 in base layer 110 and connect to balun 350. Coaxial cables 310 and 320 may run vertically side by side, with upper ends thereof penetrating opening 375 in FSS layer 120 and opening 385 in dielectric sheet 174 of antenna layer 130 to facilitate the electrical connection to crossed-dipole antenna element 135. In the stowed state, coaxial cables 310 and 320 may be collapsed similar to memory wires 115 (illustrated below in FIG. 8).

Figure 6:
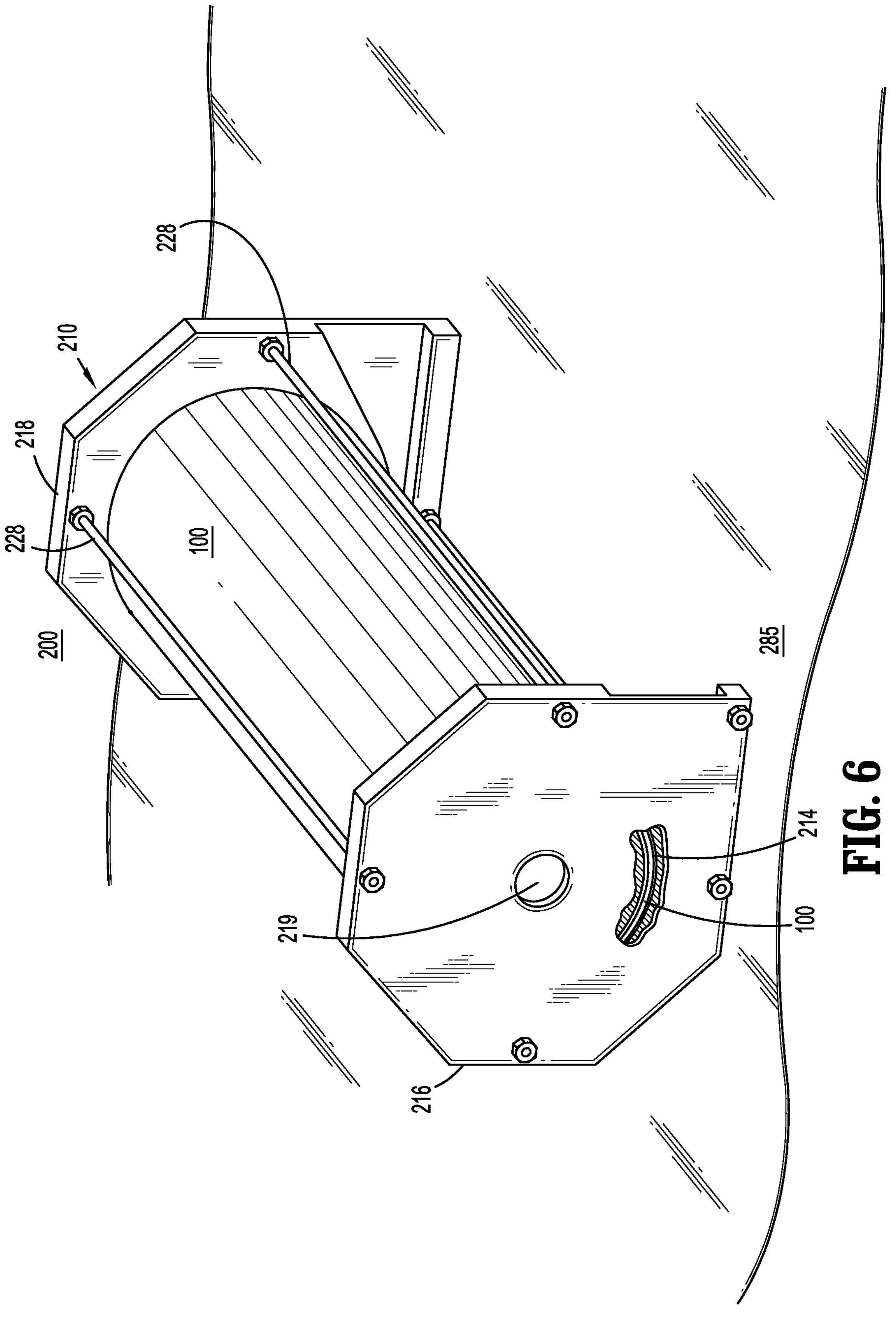
FIG. 6 is a perspective view of an example antenna apparatus including a retaining structure retaining the AMC antenna of FIG. 1 in a coiled configuration during stowage, according to an embodiment.
Figure 7:
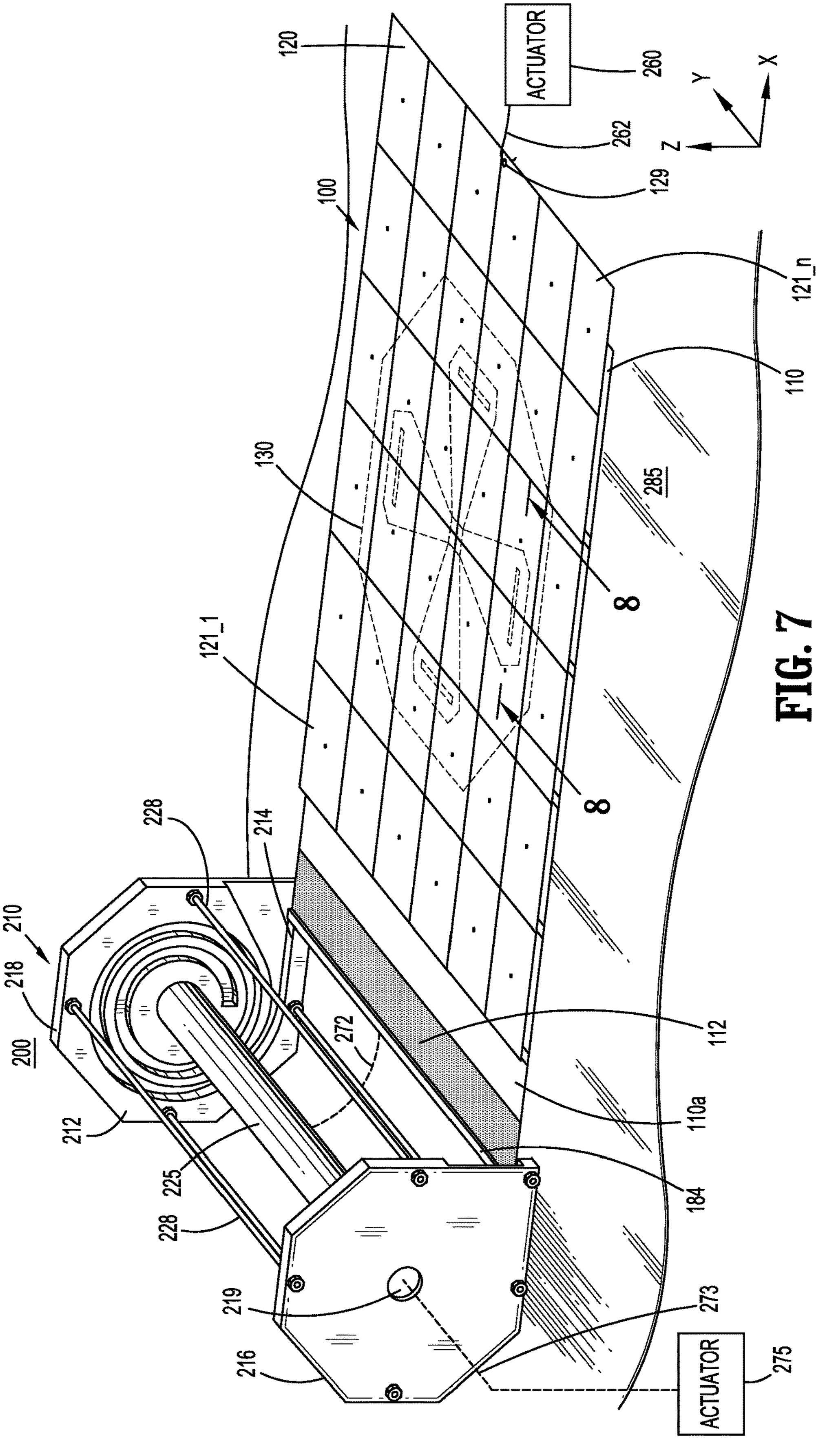
FIG. 7 is a perspective view showing the antenna apparatus of FIG. 6 following removal of the AMC antenna during deployment.

FIG. 6 is a perspective view of an example antenna apparatus including a retaining structure retaining an AMC antenna during stowage, according to an embodiment. FIG. 7 is a perspective view showing the antenna apparatus of FIG. 6 following removal of the AMC antenna during deployment. The view of FIG. 7 also illustrates an example arrangement of the AMC antenna with respect to the retaining structure prior to insertion therein. Referring to FIGS. 6 and 7, AMC antenna apparatus 200 includes AMC antenna 100 and retaining structure 210 which retains AMC antenna 100 in a coiled state during stowage. Retaining structure 210 in this embodiment is a generally cylindrical structure with first and second opposite end walls 216 and 218, a spindle 225 between end walls 216 and 218, and support rods 228 that couple end walls 216 and 218 to one another. Each of end walls 216, 218 may have a spiraling groove 214 on an inner surface 212 thereof to facilitate guiding and retaining AMC antenna 100 in a coiled configuration. Opposite edge portions of at least ground plane 105 are retained coiled within the pair of spiraling grooves 214 during stowage. If antenna layer 130 is configured coextensive with ground plane 105, opposite edge portions of antenna layer 130 may also be retained within spiraling grooves 214.

Spindle 225 may have a mechanical link 272 (shown schematically) to end rib 184 of AMC antenna 100. To initially retain AMC antenna 100 within retaining structure 210, AMC antenna 100 may be forced in a collapsed state as shown in FIG. 7. In the collapsed state, memory metal wires 115 are flexible and FSS layer 120 is collapsed towards base layer 110 such that the thickness of at least the edge portions of the collapsed structure is thinner than the width of grooves 214. Note that in the collapsed state, FSS layer 120 may be collapsed towards base layer 110 in the +x direction such that FSS layer 120 is offset with respect to base layer 110. Because the two layers are offset in the collapsed condition, a peripheral portion 110*a* of base layer 110 is no longer overlaid by a corresponding portion of FSS layer 120. For instance, the transition from the operational configuration, e.g., as seen in FIG. 1, to the collapsed configuration, and vice versa may be analogous to "four bar linkage" mechanical action. In other words, memory metal wires 115 may be considered analogous to a first pair of bars that transition between vertical and horizontal orientations. The plate-like geometries of base layer 110 and FSS layer 120 may be analogous to a second pair of bars, coupled to the first pair of bars, that shift between an aligned condition and an offset condition when the first pair of bars shifts between vertical and horizontal orientations.

Spindle 225 may be rotated (e.g., clockwise) to draw AMC antenna 100 within retaining structure 210. As an example, a hand crank (not shown) or an actuator 275 with link 273 may be coupled to an end 219 of spindle 225 to impart a rotational force to draw AMC antenna 100 within retaining structure 210. Once AMC antenna 100 is retained within retaining structure 210, AMC antenna apparatus 200 may be transported to a carrier, such as an orbital satellite prior to launch, and secured to a surface 285 of the carrier. Since retaining structure 210 is more robust to environmental conditions and motion than AMC antenna 100 itself (if otherwise mounted on surface 285 without protection), securing retaining structure 210 to surface 285 prior to deployment of AMC antenna 100 on surface 285 may improve the odds of successful deployment. As another example, surface 285 is a planetary surface or a surface of a man-made structure on a planet. In this case, retaining structure 210 with AMC antenna 100 secured therein may be transported by a drone and dropped onto surface 285 for subsequent unmanned deployment.

To deploy AMC antenna 100 from retaining structure 210, spindle 225 may be rotated (e.g., counter-clockwise) by actuator 275, whereby AMC antenna 100 may slide out in a plate-like configuration while in its collapsed state in the +x direction. Alternatively or additionally, another actuator 260 arranged on surface 285 may automatically pull out AMC antenna 100 from retaining structure 210. To this end, AMC antenna 100 may have an opening 129 on the side opposite flap 112, through which a link 262 of actuator 260 may attach to AMC antenna 100. Note that actuator 260 and/or actuator 275 may be a robotic arm secured to surface 285. Once AMC antenna 100 is removed from retaining structure 210 in the collapsed state, if ambient temperature is above the memory-shape threshold, memory metal wires 115 may automatically transition from flexible to rigid and orient themselves in the z direction. This transitions AMC antenna 100 from the collapsed state to the operational state, as depicted in FIG. 1. In an example, if ambient temperature is below the memory-shape threshold, heat may be applied to AMC antenna 100 such to raise the localized temperature surrounding AMC antenna 100 and cause memory wires 115 to transition to the memory-shaped state. In one example, heat is applied by applying electric current to memory wires 115, whereby the resistance of memory wires 115 while current is flowing produces heat sufficient to cause the transition.

Figure 8:
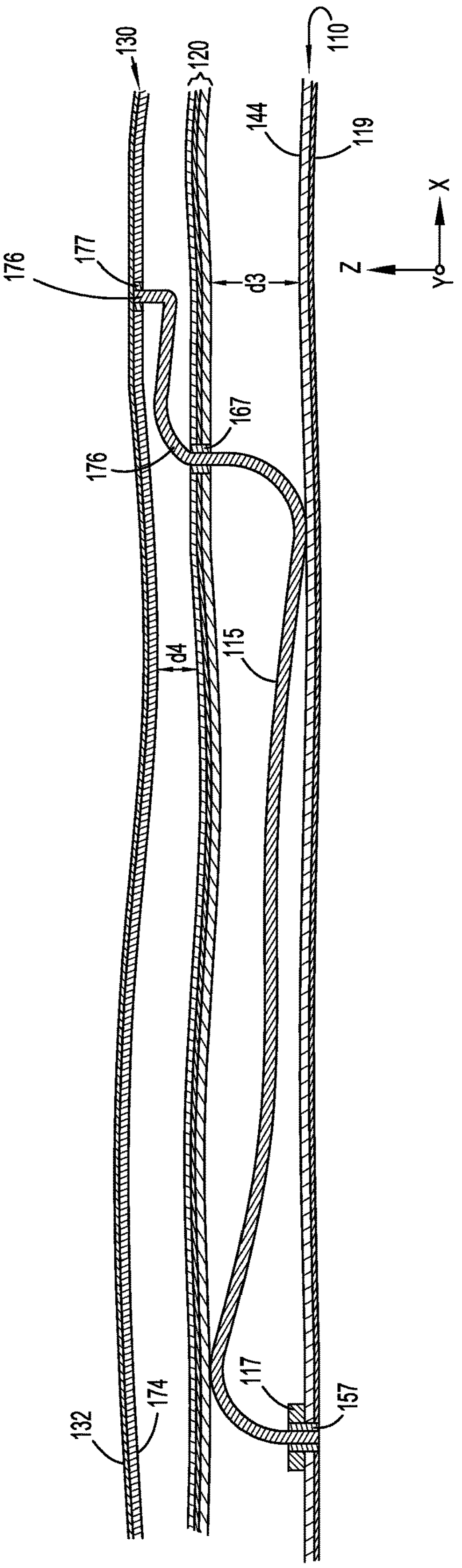
FIG. 8 is a cross-sectional view of the antenna apparatus of FIG. 7 taken along the lines 8-8, illustrating a memory metal wire in a collapsed state.

FIG. 8 is a cross-sectional view of AMC antenna 100 taken along the lines 8-8 of FIG. 7, illustrating an example structure of AMC antenna 100 in a collapsed state. When AMC antenna 100 is collapsed for stowage, memory wires 115 are flexible may be collapsed with a generally horizontal orientation (generally oriented in the x direction), whereby a spacing distance d3 between base layer 110 and FSS layer 120 is significantly less than the spacing distance d1 as seen in FIG. 2. In addition, a spacing distance d4 between FSS layer 120 and antenna layer 130 may be reduced relative to distance d2 (FIG. 2), due to a similar collapse of extensions 176. Accordingly, the overall thickness of AMC antenna 100 may be significantly less than that in the operational state, enabling compact retention within a suitable retaining structure.

Figure 9:
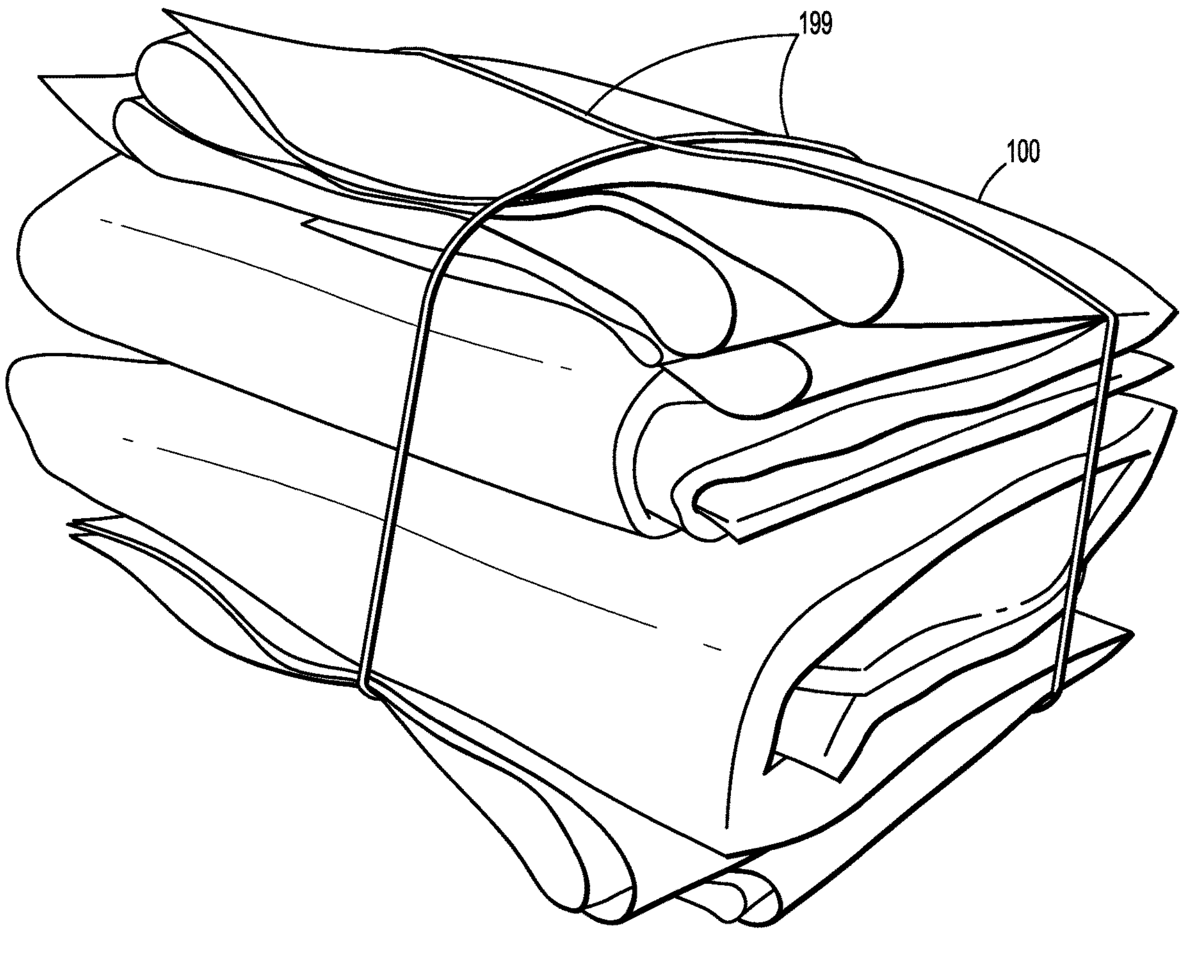
FIG. 9 illustrates the antenna apparatus of FIG. 1 in a folded state for stowage.

FIG. 9 illustrates AMC antenna 100 in a folded state for stowage, whereby transportation of AMC antenna 100 is facilitated. To fold AMC antenna 100, it is first set up in the collapsed configuration and thereafter folded at least once. A retaining structure in the form of a retaining strap 199 may then retain AMC antenna 100 in the folded state. As an example, AMC antenna 100 in the folded state may be transported to unmanned carrier surface 285 (shown in FIGS. 6 and 7) and secured thereon by suitable fasteners (not shown) coupled to retaining strap 199. For subsequent deployment of AMC antenna 100, a robot arm or the like may cut retaining strap 199 and unfold AMC antenna 100. AMC antenna 100 may thereafter automatically transition to the operational state, as memory wires 115 transition to their rigid states, in a similar manner as described above (e.g., applying heat).

Figure 10:
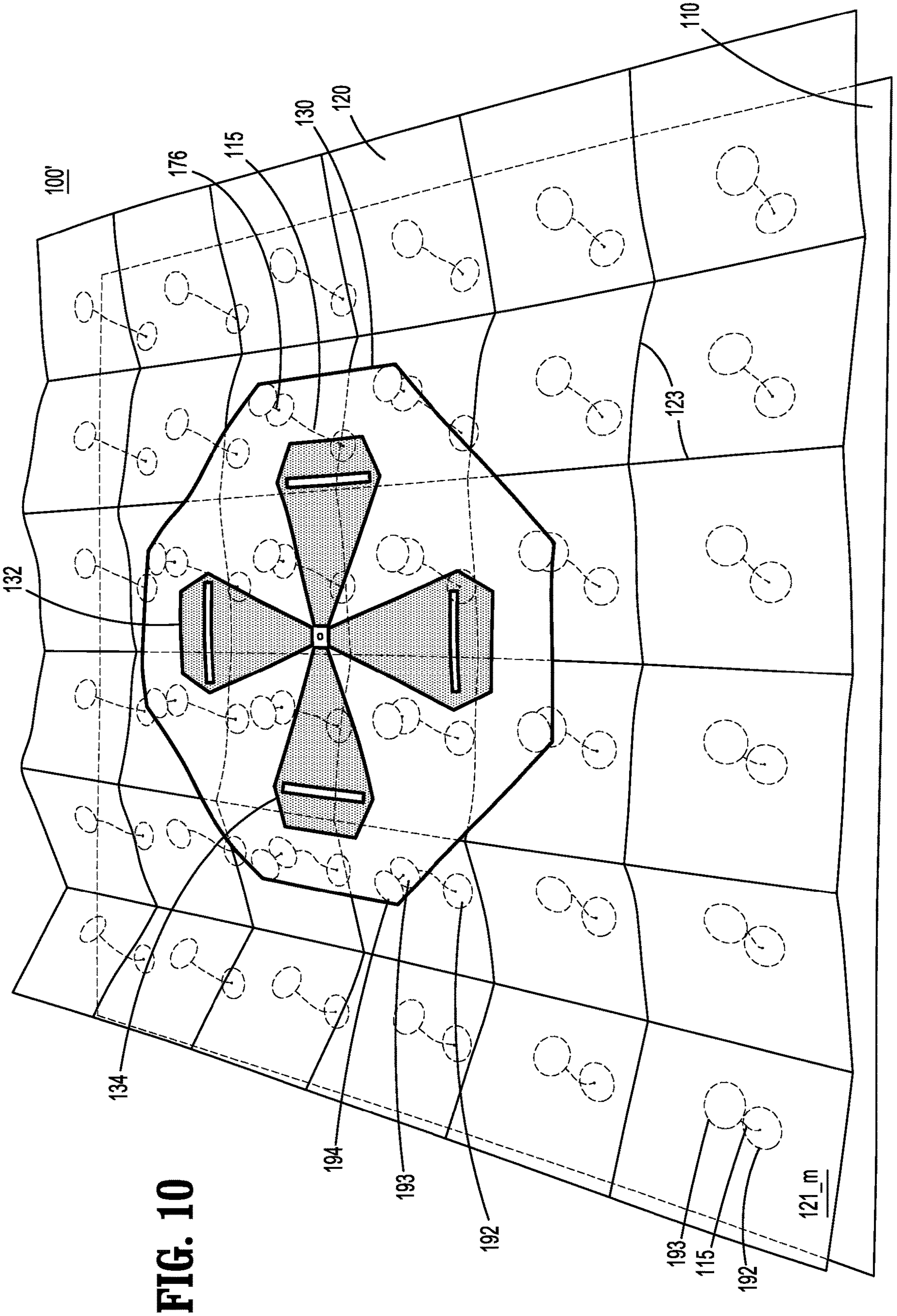
FIG. 10 is a perspective view depicting an AMC antenna in a partially deployed state according to another embodiment.
Figure 11:
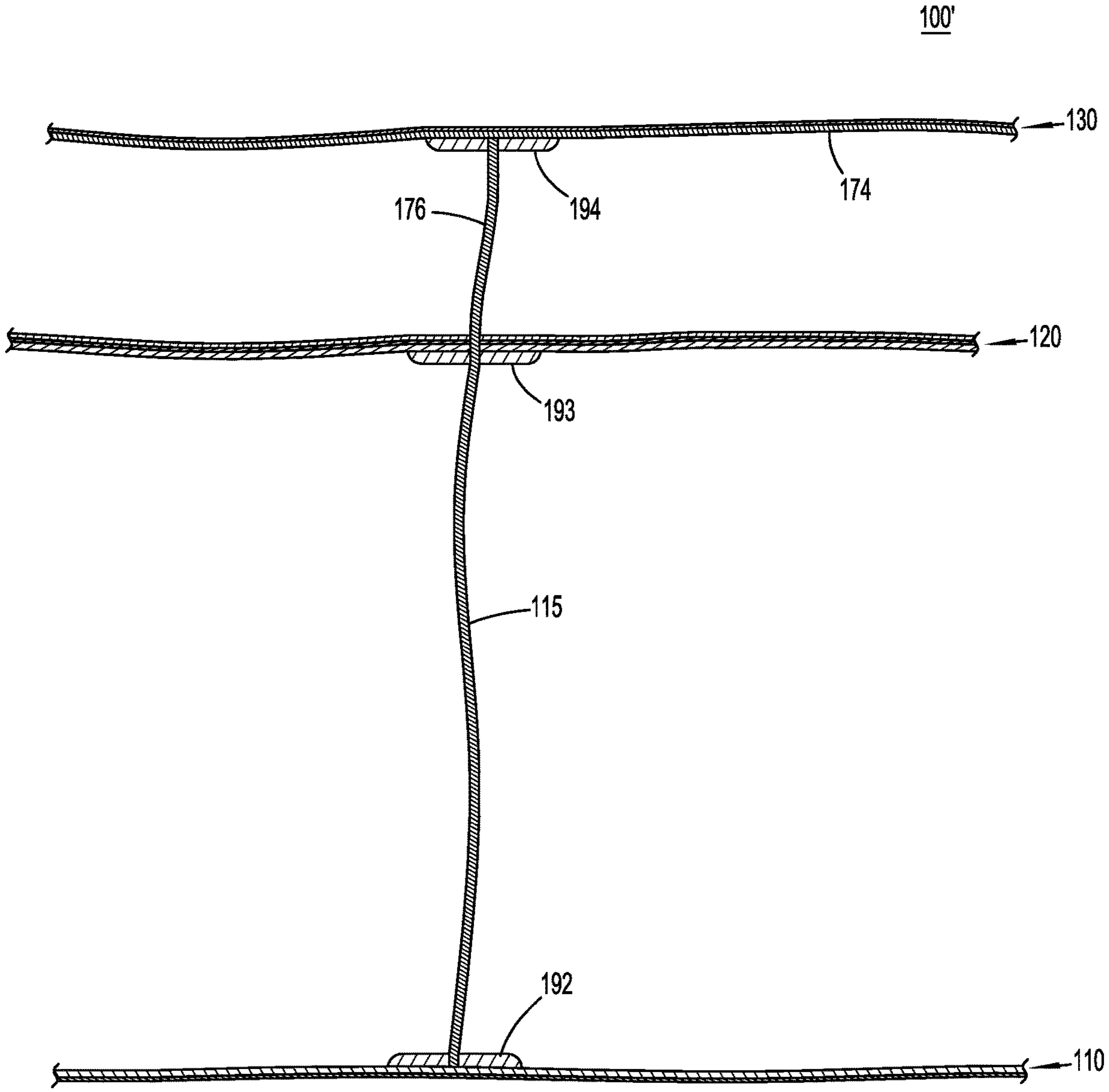
FIG. 11 is a cross-sectional view of a portion of the AMC antenna of FIG. 10.

FIG. 10 is a perspective view depicting an AMC antenna, 100', in a partially deployed state according to another embodiment. AMC antenna 100' differs from AMC antenna 100 described above by omitting support ribs 117 and employing an individual support structure for each conductive patch 121 of FSS layer 120. FIG. 11 is a cross-sectional view showing an example support structure within the centralized region of AMC antenna 100', i.e., within the region of antenna element layer 130. For conductive patches 121 underlaying the region of antenna layer 130, a support structure may include a support 192 attached to base layer 110, a support 193 attached to FSS layer 120, and a support 194 attached to antenna element layer 130. Each of supports 192, 193 and 194 may have a button-like profile, occupying a circular area at least one order of magnitude less than the surface area of the corresponding conductive patch 121. Each of supports 192-194 may be composed of dielectric material adhered to a respective one of the dielectric sheets in layers 110, 120 or 130. Each support 192, 193 and 194 may have a central opening through which a memory wire 115 traverses and is adhered to the respective support. For instance, a plated through hole may have been formed through support 192 and base layer 110 in a similar or identical manner as described above for rib 117 in connection with FIG. 2, and the lower end of memory wire 115 may be soldered to support 192 and to base layer 110 using solder within the plated through hole. A similar plated through hole may have been formed in FSS layer 120 and support 193 to adhere a central section of memory wire 115 to support 193. Moreover, a blind via may have been formed through support 194 and dielectric sheet 174 of antenna element layer 130 to adhere an extension 176 of memory wire 115 to support 194 and to antenna element layer 130. For peripherally located conductive patches 121 that do not underly antenna element layer 130, such as conductive patch 121_*m*, only supports 192 and 193 may be utilized, and extensions 176 may be omitted. Thus, upper ends of memory wires 115 may be flush with the upper surface of FSS layer 120.

Other aspects of AMC antenna 100' may be the same as those described above for AMC antenna 100. AMC antenna 100' may be retained and removed from a retaining structure such as 210 or 199 in a similar manner as described above for AMC antenna 100.

Figure 12:
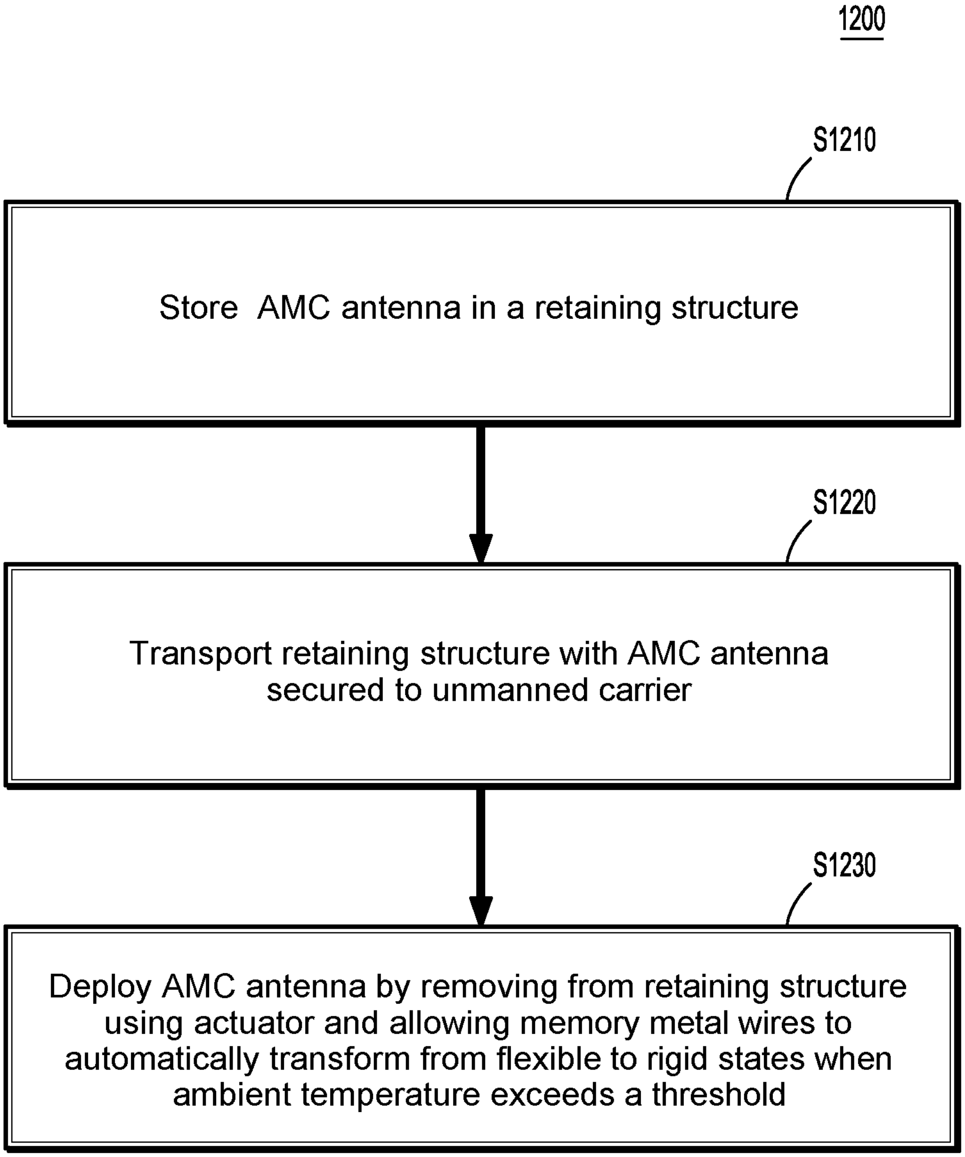
FIG. 12 is a flow chart depicting operations of an example method of deploying an AMC antenna on an unmanned carrier according to an embodiment.

FIG. 12 is a flow chart depicting operations of an example method, 1200, of deploying an AMC antenna on an unmanned carrier according to an embodiment. With method 1200, the AMC antenna, e.g., 100 or 100', is first stored in its collapsed state in a retaining structure such as 210 or 199 described above (S1210). The retaining structure may then be transported with the AMC antenna stored therein to an unmanned carrier (S1220). As mentioned earlier, some examples of the unmanned carrier (e.g., a carrier including surface 285) include an orbital satellite, a planetary surface or a man-made structure on a planetary surface.

The AMC antenna may then be deployed (S1230) by removing the same from the retaining structure using an actuator (e.g., 275 and/or 260) as described above, and allowing the memory metal wires 115 of the AMC antenna to automatically transition from flexible to rigid states when ambient temperature exceeds the memory-shape threshold. When the transition to rigid states is complete, the AMC antenna is set up for operation (e.g., in the above-described configuration shown in FIG. 1). As noted above, if ambient temperature during deployment is below the memory-shape threshold, heat may be applied to the AMC antenna to raise the localized temperature surrounding the AMC antenna and cause memory wires 115 to transition to the memory-shaped state. Heat may be applied by applying electric current to memory wires 115, whereby the resistance of memory wires 115 while current is flowing produces heat sufficient to cause the transition. With the AMC antenna in an operational configuration, a robotic arm or the like may secure the AMC antenna to the surface 285 of the carrier, and electrically connect the balun 350 of the AMC antenna to an RF front end of a communication system, whereby active communication of signals by the AMC antenna may be initiated.

While the technology described herein has been particularly shown and described with reference to example embodiments thereof, it will be understood by those of ordinary skill in the art that various changes in form and details may be made therein without departing from the spirit and scope of the claimed subject matter as defined by the following claims and their equivalents.

What is claimed is:

1. An artificial magnetic conductor (AMC) antenna apparatus comprising:
- a ground plane comprising:
  - a conductive base surface;
  - a frequency selective surface (FSS) layer above the base surface, the FSS layer comprising a plurality of conductive patches separated from one another; and
  - a plurality of memory metal wires, each electrically connecting one of the conductive patches to the base surface and each being rigid in a memory-shaped state, causing the FSS layer to be fixedly spaced from the base surface during operation of the AMC antenna apparatus, and each being flexible in a non-memory-shaped state, enabling the FSS layer to be collapsed towards the base surface when the antenna apparatus is stowed; and
- a flexible antenna element layer above the FSS layer, comprising at least one antenna element.

2. The AMC antenna apparatus of claim 1, wherein:
- the plurality of conductive patches is a plurality of printed conductive patches on a first dielectric sheet; and
- the at least one antenna element is at least one printed conductive element on a second dielectric sheet;
- wherein each of the first and second dielectric sheets is flexible.

3. The AMC antenna apparatus of claim 2, wherein;
each of the memory metal wires has a substantially identical length, such that the FSS layer is uniformly spaced from the base surface; and
the first dielectric sheet is mechanically coupled to the second dielectric sheet such that the antenna element layer is uniformly spaced from the FSS layer.

4. The AMC antenna apparatus of claim 3, wherein the memory metal wires include respective extensions that extend above the FSS layer, and the first dielectric sheet is mechanically coupled to the second dielectric sheet and uniformly spaced therefrom by the extensions when the memory metal wires are rigid in the memory-shaped state.

5. The AMC antenna apparatus of claim 1, further comprising a retaining structure configured to retain, when the antenna apparatus is stowed, the antenna element layer and the ground plane with the FSS layer collapsed towards the base surface.

6. The AMC antenna apparatus of claim 5, further comprising at least one actuator configured to remove the antenna element layer and the ground plane from the retaining structure.

7. The AMC antenna apparatus of claim 5, wherein the retaining structure retains the antenna element layer and the ground plane in a coiled state.

8. The AMC antenna apparatus of claim 7, wherein the retaining structure is a cylindrical structure comprising a pair of spiraling grooves in respective opposite ends, wherein opposite edge portions of the ground plane are retained coiled within the pair of spiraling grooves.

9. The AMC antenna apparatus of claim 1, wherein the memory metal wires are composed of nitinol.

10. The AMC antenna apparatus of claim 1, further comprising a flexible antenna feed having a first end electrically connecting to the at least one antenna element, an opposite end below the base surface, and a central portion extending between the base surface and the at least one antenna element through at least one opening in the FSS layer.

11. The AMC antenna apparatus of claim 10, further comprising a balun disposed below the base surface and connected to the opposite end of the antenna feed.

12. The AMC antenna apparatus of claim 10, wherein the antenna feed comprises at least one flexible coaxial cable having a linear shape when the memory metal wires are in the memory-shaped state and having a collapsed, nonlinear configuration when the memory metal wires are in the non-memory-shaped state.

13. The AMC antenna apparatus of claim 1, wherein the at least one antenna element comprises at least one crossed-dipole antenna element.

14. The AMC antenna apparatus of claim 1, wherein the ground plane and the antenna element layer are each folded when the antenna apparatus is stowed.

15. The AMC antenna apparatus of claim 1, wherein the base surface comprises printed conductive material on a flexible substrate.

16. The AMC antenna apparatus of claim 1, further comprising a plurality of support structures each supporting a mechanical connection between one of the memory metal wires and the base surface and/or one of the conductive patches.

17. A method of deploying an artificial magnetic conductor (AMC) antenna on an unmanned carrier, the method comprising:
storing the AMC antenna in a retaining structure, the AMC antenna comprising: (i) an antenna element layer; and (ii) a ground plane with a conductive base surface, a frequency selective surface (FSS) layer, and a plurality of memory metal wires electrically and mechanically coupling the conductive base surface to the FSS layer, the plurality of memory metal wires being in a collapsed, non-memory-shaped state when the AMC antenna is stored; and
removing, using an actuator, the AMC antenna from the retaining structure to deploy the AMC antenna,
wherein the memory metal wires automatically transform from flexible to rigid states when ambient temperature exceeds a threshold, causing the FSS layer to be fixedly spaced from the base surface following the removal of the AMC antenna from the retaining structure.

18. The method of claim 17, wherein the unmanned carrier is an orbital satellite.

19. The method of claim 17, wherein the retaining structure retains the AMC antenna in a coiled state, and the actuator causing the AMC antenna to be rolled out of the retaining structure in a plate-like shape.

20. The method of claim 19, wherein the AMC antenna further comprises a flexible antenna feed stored in a coiled shape within the retaining structure and unrolling during the removal of the AMC antenna.

* * * * *